United States Patent
Jedneak

(10) Patent No.: US 8,864,615 B2
(45) Date of Patent: Oct. 21, 2014

(54) PLANETARY GEAR RETRIEVAL SYSTEM

(71) Applicant: Inland Pipe Rehabilitation, L.L.C., The Woodlands, TX (US)

(72) Inventor: Allan Ray Jedneak, Andover, MN (US)

(73) Assignee: Inland Pipe Rehabilitation, L.L.C., The Woodlands, TX (US)

( * ) Notice: Subject to any disclaimer, the term of this patent is extended or adjusted under 35 U.S.C. 154(b) by 159 days.

(21) Appl. No.: 13/737,601

(22) Filed: Jan. 9, 2013

(65) Prior Publication Data

US 2013/0281255 A1 Oct. 24, 2013

Related U.S. Application Data

(60) Provisional application No. 61/636,407, filed on Apr. 20, 2012.

(51) Int. Cl.
| | | |
|---|---|---|
| *F16H 37/02* | (2006.01) | |
| *B05D 7/22* | (2006.01) | |
| *F16H 37/04* | (2006.01) | |
| *B66D 1/02* | (2006.01) | |

(52) U.S. Cl.
CPC ............... *F16H 37/041* (2013.01); *B66D 1/02* (2013.01)
USPC ........... 475/210; 475/212; 475/213; 427/230; 118/306

(58) Field of Classification Search
CPC .......... B05C 7/08; B05D 7/222; F16H 37/041
USPC .......... 475/210, 212, 213, 343; 427/230–239; 118/305–307
See application file for complete search history.

(56) References Cited

U.S. PATENT DOCUMENTS

| | | | | |
|---|---|---|---|---|
| 2,305,239 | A | * 12/1942 | Crom | 405/150.2 |
| 2,461,517 | A | 2/1949 | Carnevale | |
| 2,758,352 | A | * 8/1956 | Perkins | 425/262 |
| 3,012,757 | A | 12/1961 | Marzolf | |
| 3,022,765 | A | 2/1962 | Xenis | |
| 3,078,823 | A | * 2/1963 | Cummings et al. | 118/306 |
| 3,108,348 | A | * 10/1963 | Schultz | 425/262 |
| 3,525,111 | A | 8/1970 | Arx | |

(Continued)

FOREIGN PATENT DOCUMENTS

| | | |
|---|---|---|
| DE | 19823398 A1 | 12/1999 |
| EP | 1351009 A1 | 10/2003 |

(Continued)

OTHER PUBLICATIONS

International Search Report of International PCT Application No. PCT/US2013/030189, dated Apr. 20, 2012.

(Continued)

*Primary Examiner* — Tisha Lewis
(74) *Attorney, Agent, or Firm* — Marshall, Gerstein & Borun LLP

(57) ABSTRACT

A planetary gear retrieval system for pulling a sled at a constant velocity along an interior of a pipe. The system includes a network of gears, one of the gears powered by a gear motor, which is in operable communication with a variable speed microcontroller. A chain is threaded through the network of gears and an end of the chain is connected to the sled.

14 Claims, 5 Drawing Sheets

(56) References Cited

U.S. PATENT DOCUMENTS

| | | |
|---|---|---|
| 3,606,862 A | 9/1971 | Huff et al. |
| 4,023,502 A | 5/1977 | Elsing |
| 4,148,465 A | 4/1979 | Bowman |
| 4,252,763 A | 2/1981 | Padgett |
| 4,493,593 A | 1/1985 | Schlimbach |
| 5,409,561 A | 4/1995 | Wood |
| 6,209,852 B1 | 4/2001 | George et al. |
| 6,227,813 B1 | 5/2001 | Leimer |
| 6,427,726 B1 | 8/2002 | Kiest, Jr. |
| 6,632,475 B1 | 10/2003 | Bleggi |
| 6,699,324 B1 | 3/2004 | Berdin et al. |
| 6,926,466 B2 * | 8/2005 | Pare .................. 405/184.2 |
| 6,986,813 B2 | 1/2006 | Davis |
| 7,275,733 B2 | 10/2007 | Svitavsky et al. |
| 7,866,277 B1 | 1/2011 | Weisenberg |
| 8,079,569 B2 | 12/2011 | Lesko |
| 2012/0036949 A1 * | 2/2012 | Markon ........................ 74/37 |

FOREIGN PATENT DOCUMENTS

| | | |
|---|---|---|
| EP | 2258974 A2 | 12/2010 |
| EP | 2258974 A3 | 5/2013 |
| WO | WO-2004112972 A1 | 12/2004 |

OTHER PUBLICATIONS

Written Opinion of International PCT Application No. PCT/US2013/030189, dated Apr. 20, 2012.

\* cited by examiner

PLANETARY GEAR RETRIEVAL SYSTEM

CROSS-REFERENCE TO RELATED APPLICATION

The present application claims the benefit of the filing date of U.S. Provisional Application No. 61/636,407, filed Apr. 20, 2012. The entire text of U.S. Provisional Application No. 61/636, 407 is incorporated herein by reference.

FIELD OF THE DISCLOSURE

This disclosure relates generally to reinforcement of pipes by applying a continuous thickness of a coating material to the interior thereof and, more specifically, to a mechanism to ensure constant-velocity advancement of a sled carrying a spinner that sprays the coating material, the mechanism including a planetary gear that drives a retrieval chain attached to the sled.

BACKGROUND OF THE DISCLOSURE

When applying a coating material, for example, a cementitious mortar, to an interior wall of a pipe, for example, a large diameter pipe, for the purpose of reinforcement of the pipe so as to prolong its service life, it is desirable to apply a constant thickness of the coating material over a given length of the pipe. A spinner mounted to a sled that can be moved along the interior of the pipe to be reinforced provides an effective vehicle for spraying a coating material to the interior of the pipe. In order to actuate the sled, a chain may be secured to a leading end of the sled, and retrieval system may be provided to pull the chain, and thereby pull the sled, along the interior of the pipe. While the retrieval system could be in the form of a spool, it is recognized that during movement of the sled, as more and more of the chain is collected by the retrieval system and wound about the spool, assuming a constant angular velocity of the spool, the effective rate of movement of the sled decreases. As a result, unless the rate of spray of the coating material is adjusted, the thickness of coating material unacceptably increases as the sled approached the spool.

SUMMARY OF THE DISCLOSURE

The present disclosure provides a retrieval system having a planetary gear so as to present a chain drive system that pulls a sled, to which a spinner is mounted, at a constant velocity along the interior of a given length of a pipe, without the need to adjust the gear motor of the retrieval system, or the rate of spray of the spinner, during application of a coating material to the interior of the pipe.

DETAILED DESCRIPTION OF THE PREFERRED EMBODIMENT

Disclosed herein is a mechanism to ensure constant-velocity advancement of a sled carrying a spinner that sprays a coating material, the mechanism including a planetary gear that drives a retrieval chain attached to the sled. Pipes and other openings such as tunnels and culverts can be coated for a variety of purposes with a variety of materials. For example, pipes can be coated with a cementitious mortar to reinforce the structure of the pipes. In many applications, it is desirable to ensure a coating having a uniform thickness. As used herein, the term "pipe" generally refers to any conduit, including, for example, pipes, culverts, tunnels, and ducts. The pipe can have a diameter, for example, of 24 inches or greater. For example, in some embodiments, a pipe can have a large-diameter, for example, greater than or equal to 102 inches or greater than or equal to 170 inches. The pipe can have any suitable cross-sectional shape. For example, the pipe can have a circular, square, ellipsoidal, half-circular, or rectangular cross-sectional shape. The pipe can be formed of any suitable material. For example, the pipe can be formed of cast iron, reinforced concrete, steel, brick, and/or stone. For example, in one embodiment, the pipe is a tunnel formed of sandstone. The pipe can have solid or corrugated walls.

The coating material can be any desirable coating material. For example, the coating material can include, but not limited to, a cementitious mortar, an epoxy, a paint, and/or tar.

Figure 1:
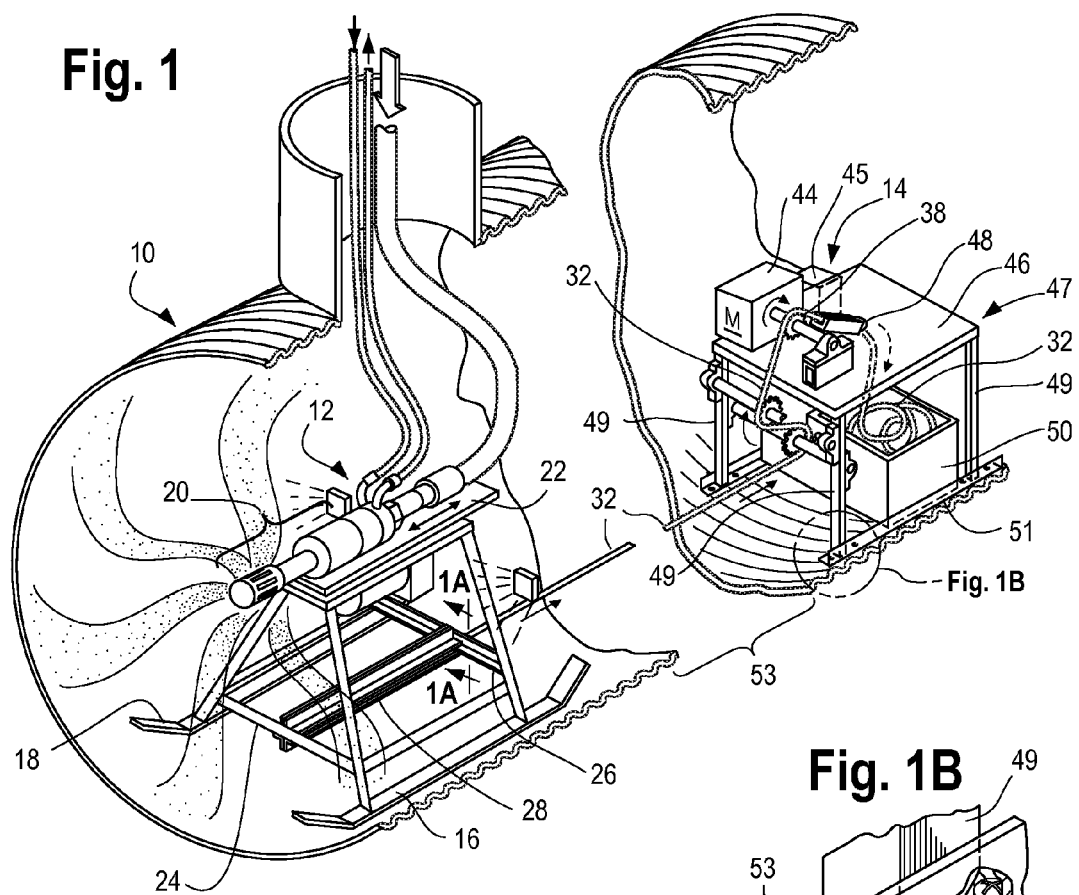
FIG. 1 is a perspective view of a sled assembly for application of a coating material and a planetary gear retrieval system of the present disclosure, the sled assembly including a spinner disposed on a linear oscillating plate, both the sled assembly and the planetary gear retrieval system disposed within a pipe, and a cover of the planetary gear retrieval system is removed for clarity.

Referring now to FIG. 1, a pipe 10, which may be corrugated, is illustrated. Within the pipe 10 are a sled 12 and a planetary gear retrieval system 14. The sled 12 may be made of a lightweight, durable alloy, such as titanium, includes a pair of skis 16, 18. A spinner 20 is mounted on the sled 12. As it is desirable to apply the coating material using a reciprocating motion, the spinner 20 (which may, for example, be an SPN1000 or SP1500, with slotted rotary head, available from Cangro Industries, Inc., RFI Construction Products Div., Farmingdale, N.Y.) is preferably mounted on a linear oscillating plate 22. The sled 12 includes cross braces 24, 26 which may be in the form of angle members. A central reinforcement member 28, which may be in the form of a plurality of angle members, may extend between the cross braces 24, 26. The sled 12 may optionally be provided with one or more rear-facing lights, such as LED lights 28, 30, mounted at or near a leading end of the sled 12, to provide illumination of the interior of the pipe 10, in real time, during application of coating material via the spinner 20.

Figure 1B:
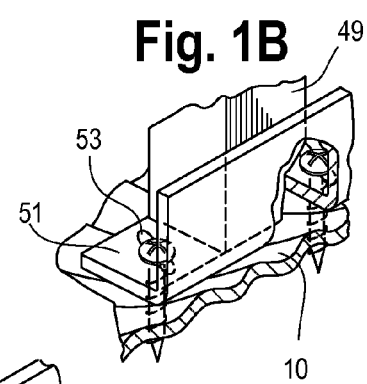
FIG. 1B is an enlarged, perspective view of a region of FIG. 1 designated as "FIG. 1B," illustrating a portion of a base of the planetary gear retrieval system bolted to a floor of the pipe.
Figure 1A:
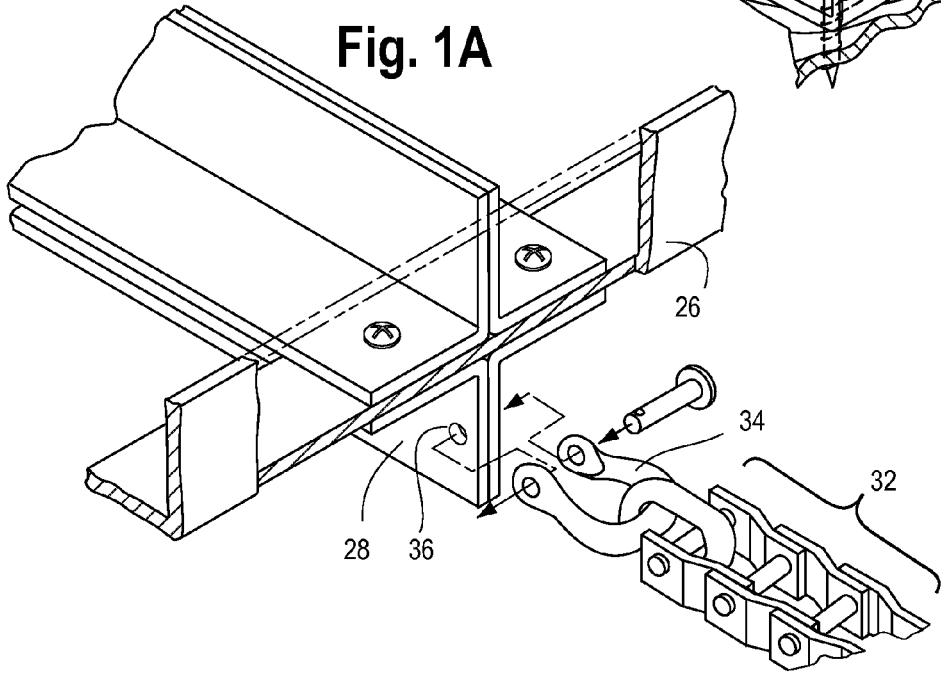
FIG. 1A is a cross-sectional view of a portion of a base of the sled assembly, taken along the lines 1A-1A of FIG. 1, illustrating a chain aperture and a chain link attachable to the chain aperture so as to secure a chain, which is driven by the planetary gear retrieval system, to the sled assembly.
Figure 2:
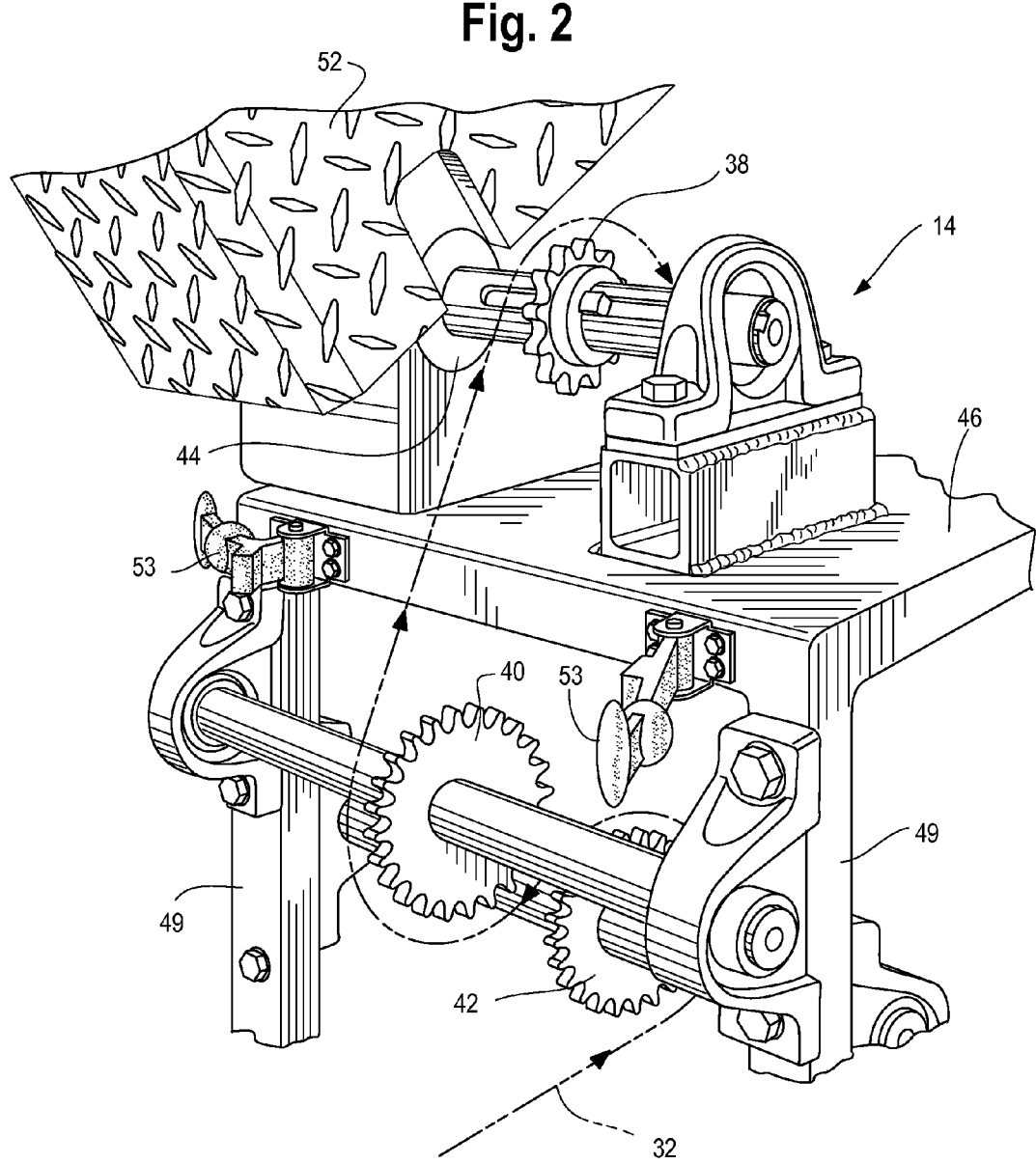
FIG. 2 is a front, perspective view of the planetary gear retrieval system of FIG. 1 with the cover for the planetary gear retrieval system illustrated in an open position, and illustrating a path within the planetary gear retrieval system through which the chain travels.

A chain 32 is secured by a chain link 34 through a chain aperture 36 provided in the central reinforcement member 28 near the leading end of the sled 12, such as by a cotter pin 38 that extends through the both the chain link 34 and the chain aperture 36. The planetary gear retrieval system 14, as best illustrated in FIG. 2, has a network of gears including a first gear 38, a second gear 40, and third gear 42. The first gear 38 is preferably a driving gear, powered by a gear motor 44 that is controlled by a variable speed microcontroller 45 (such as a Fuji model FRN001C1S-2U microcontroller), while the second gear 40 and third gear 42 are preferably passive, or driven, gears. The chain 32 is threaded through the gears 38, 40, 42, such that rotation of the first gear 38 at a constant rotational speed imparts rotation of the second gear 40 and the third gear 42, and the chain 32 pulls the sled 12 in a direction toward the planetary gear retrieval system 14 at a constant rate. As illustrated in FIG. 1B, the planetary gear retrieval system 14 includes a stand 47 having legs 49 with cross-support braces 51 that may be bolted or otherwise fastened to a floor of the pipe 10 through fastener-receiving apertures 53 so as to avoid movement of the planetary gear retrieval system 14 during operation of the gear motor 44.

The planetary gear retrieval system 14 further includes a shelf or plate 46 on which the gear motor 44 may be mounted, the plate 46 being supported by the legs 49. The first gear 38 is disposed above the plate 46, so the plate is provided with an aperture 48 that permits the chain 32 to pass through the plate 46 and into a chain collection box 50 provided in a base of the planetary gear retrieval system 14.

To protect the planetary gear retrieval system 14 from coating material and other debris, a cover member 52 may be provided that can selectively be positioned over the network of gears. The cover member 52 is preferably hingedly mounted to the plate 46, and latches 53 may be provided to secure the cover member in a closed position.

Figure 3:
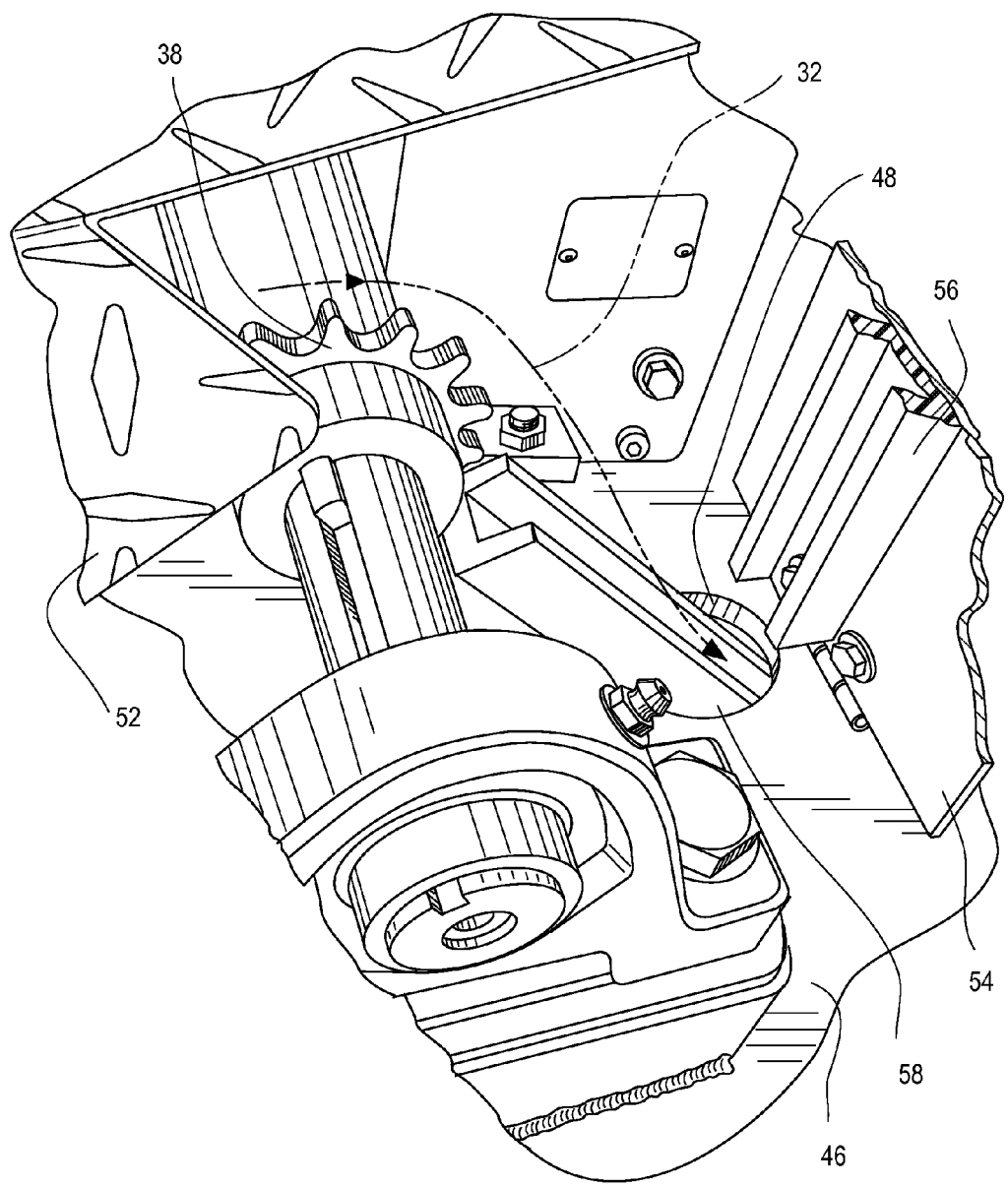
FIG. 3 is a top view perspective view of an upper portion of the planetary gear retrieval system of FIG. 1, illustrating a driving gear of the planetary gear system and a chute defining a path through which the chain passes through a support plate of the planetary gear retrieval system.
Figure 4:
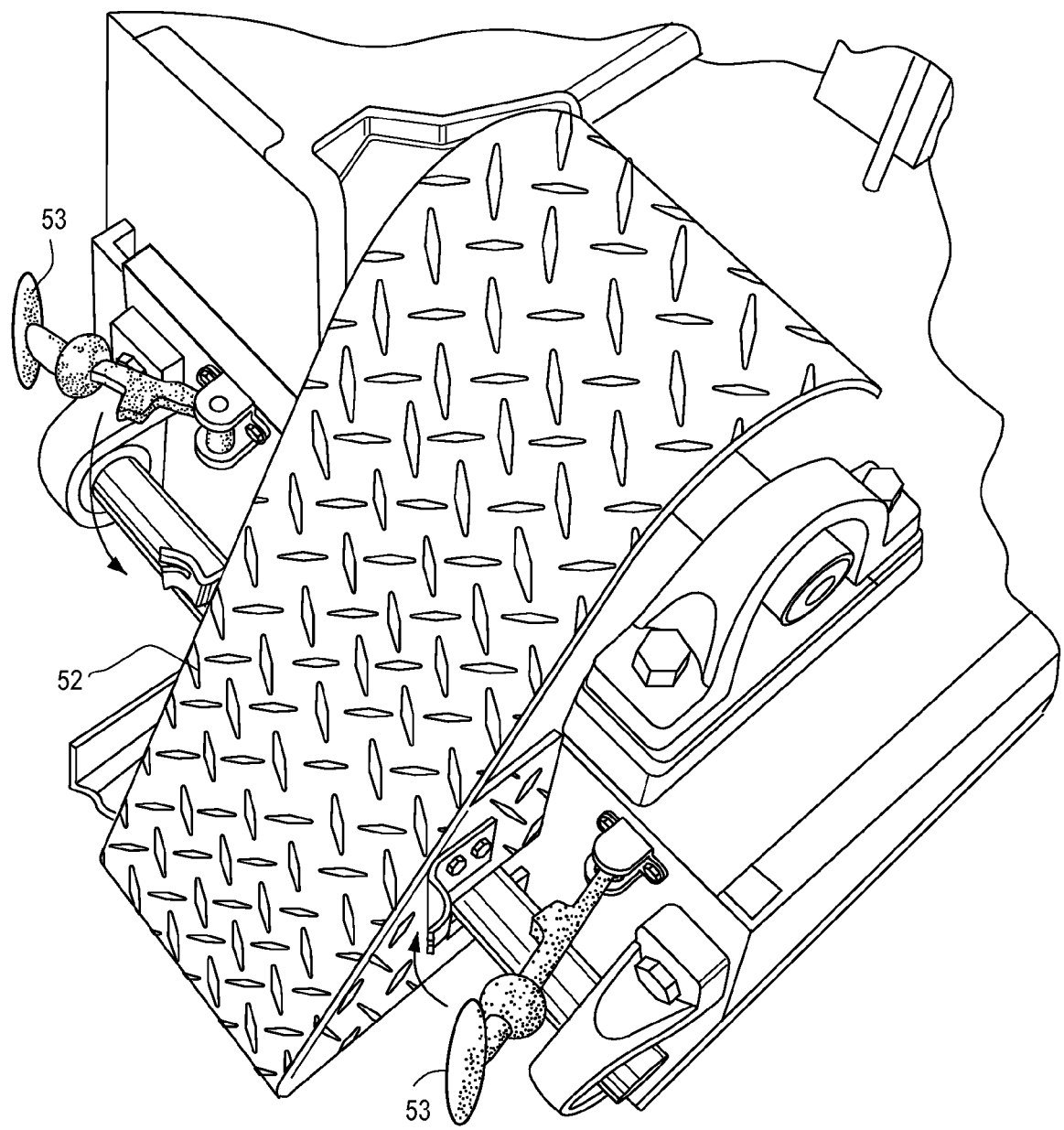
FIG. 4 is a top, perspective view of the planetary gear retrieval system of FIG. 1 with the cover to the planetary gear retrieval system in a closed position.
Figure 5:
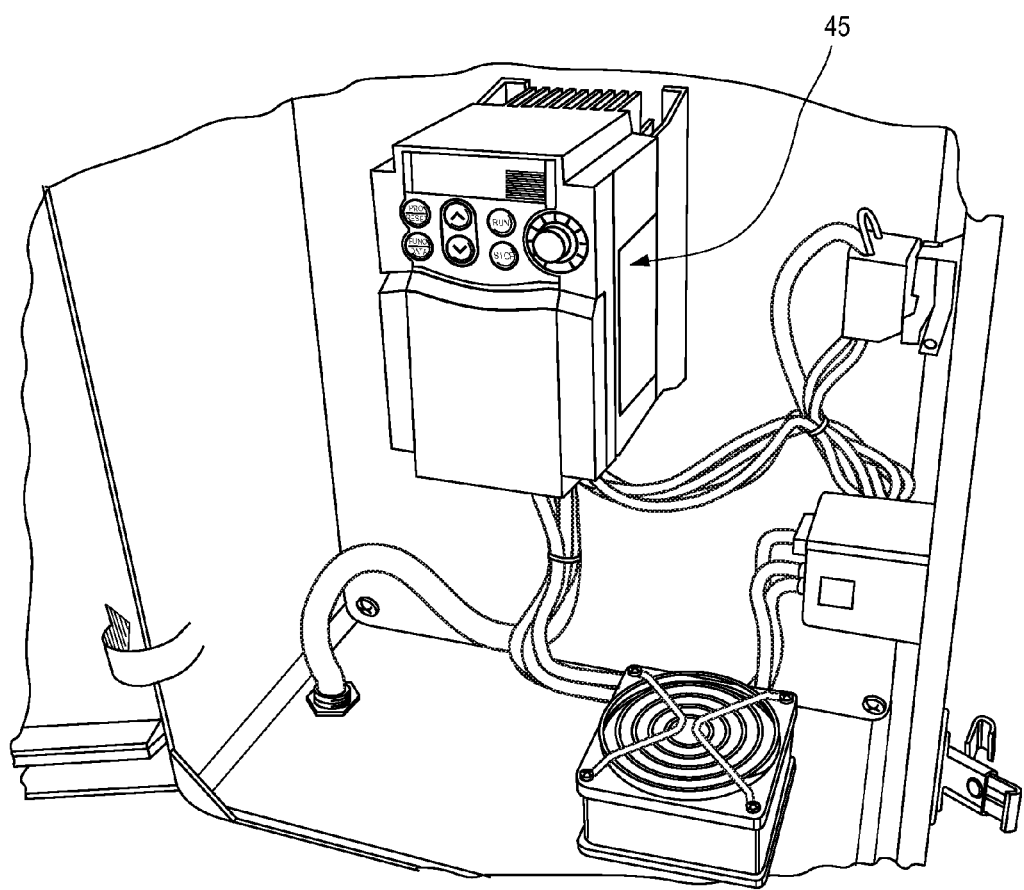
FIG. 5 is a perspective view of a variable speed microcontroller that is in operable communication with a gear motor of the planetary gear retrieval system of the present disclosure.

Turning now to FIG. 3, which illustrates the cover member 52 in an open position, it can be seen that on an underside of a rear panel 54 of the cover member, an inverted U-shaped channel 56 is provided in alignment with a similar upright U-shaped channel 58 that passes through the aperture 48. When the cover member 52 is closed (as illustrated in FIG. 4), the inverted U-shaped channel 56 cooperates with the upright U-shaped channel 58 to define an inclined chute to direct the chain 32 through the aperture 48 in the plate 46 so that the chain 32 can be fed into the chain collection box 50. The U-shaped channels 56, 58 are preferably made of a plastic material having a low coefficient of friction to facilitate smooth advancement of the chain 32 through the aperture 48 in the plate 46.

During operation, the variable speed microcontroller 45 signals the gear motor 44 to actuate the first gear 38 at a constant rotational speed, thereby driving the second and third gears 40, 42 (via the chain 32). The chain 32, which is attached to the central reinforcement member 28 of the sled 12, pulls the sled 12 toward the planetary gear retrieval system at a constant rate.

While various embodiments have been described herein, it is understood that the appended claims are not intended to be limited thereto, and may include variations that are still within the literal or equivalent scope of the claims.

What is claimed is:

1. A planetary gear retrieval system for pulling a sled at a constant rate along an interior of a pipe, comprising:
    a network of gears including a first gear, a second gear, and a third gear, the first gear being powered by a gear motor;
    a chain threaded through the first, second, and third gears, the chain having an end attachable to a sled to be pulled by the planetary gear retrieval system, and wherein the network of gears is supported by a stand, the stand including a plurality of legs and a plate on which the gear motor is supported.

2. The planetary gear retrieval system of claim 1, wherein the first gear is disposed above the plate and the plate includes an aperture therein through which the chain may pass through the plate.

3. The planetary gear retrieval system of claim 2, further including an inclined upright U-shaped channel member extending upward from the aperture, the upright U-shaped channel member directing the chain from the first gear through the aperture.

4. The planetary gear retrieval system of claim 3, further including a cover member selectively positioned in a closed position over the network of gears.

5. The planetary gear retrieval system of claim 4, wherein the cover member is hingedly secured to the plate.

6. The planetary gear retrieval system of claim 4, wherein the cover member includes an inverted U-shaped channel member that, upon positioning the cover member in the closed position over the network of gears, cooperates with the upright U-shaped channel member to define an inclined chute directing the chain from the first gear through the aperture.

7. A planetary gear retrieval system for pulling a sled at a constant rate along an interior of a pipe, comprising:
    a stand including
        a plurality of legs;
        a plurality of supports extending between the legs at a bottom of the stand; and
        a plate supported by the legs;
    a gear motor supported by the plate;
    a network of gears provided on the stand, including a first gear powered by the gear motor, a second gear, and a third gear; and a chain threaded through the first, second, and third gears, the chain having an end attachable to a sled to be pulled by the planetary gear retrieval system.

8. The planetary gear retrieval system of claim 7, wherein each of the plurality of supports extending between the legs include fastener-receiving apertures to facilitate securement of the planetary gear retrieval system to a floor of a pipe.

9. The planetary gear retrieval system of claim 7, wherein the plate includes an aperture therein through which the chain may pass through the plate.

10. The planetary gear retrieval system of claim 9, further including a chain collection box provided in a base of the stand.

11. The planetary gear retrieval system of claim 7, further including a cover member selectively positioned in a closed position over the network of gears.

12. The planetary gear retrieval system of claim 11, wherein the cover member is hingedly secured to the plate.

13. The planetary gear retrieval system of claim 11, further comprising an inclined upright U-shaped channel member extending upward from the aperture and an inverted U-shaped channel member provided on an underside of the cover member, the upright U-shaped channel member and the inverted U-shaped channel member cooperating with one another upon the closure of the cover member over the network of gears to define an inclined chute directing the chain from the first gear through the aperture.

14. The planetary gear retrieval system of claim 13, wherein the upright U-shaped channel member and the inverted U-shaped channel member are made of a plastic material having a low coefficient of friction.

* * * * *